US010613558B2

(12) United States Patent
Nath et al.

(10) Patent No.: US 10,613,558 B2
(45) Date of Patent: Apr. 7, 2020

(54) MALFUNCTION LIGHTING (71) Applicant: Heatcraft Refrigeration Products LLC, Stone Mountain, GA (US)

(72) Inventors: Shashwat Nath, Sandy Springs, GA (US); Chris Tracy, Frisco, TX (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 0 days.

(21) Appl. No.: 15/703,701

(22) Filed: Sep. 13, 2017

(65) Prior Publication Data

US 2019/0079546 A1    Mar. 14, 2019

(51) Int. Cl.
| | |
|---|---|
| *G05D 23/19* | (2006.01) |
| *F24F 11/00* | (2018.01) |
| *F24F 13/08* | (2006.01) |
| *G05B 23/02* | (2006.01) |
| *F21V 33/00* | (2006.01) |
| *F24F 11/30* | (2018.01) |
| *F24F 11/62* | (2018.01) |
| *F24F 11/89* | (2018.01) |
| *F24F 11/32* | (2018.01) |
| *G05B 15/02* | (2006.01) |

(Continued)

(52) U.S. Cl.
CPC ..... *G05D 23/1934* (2013.01); *F21V 33/0092* (2013.01); *F24F 11/30* (2018.01); *F24F 11/32* (2018.01); *F24F 11/38* (2018.01); *F24F 11/52* (2018.01); *F24F 11/526* (2018.01); *F24F 11/62* (2018.01); *F24F 11/89* (2018.01); *F24F 13/082* (2013.01); *G05B 15/02* (2013.01); *G05B 23/0235* (2013.01); *G05B 23/0264* (2013.01); *F24F 2110/00* (2018.01); *F24F 2140/50* (2018.01); *G05B 2219/2614* (2013.01)

(58) Field of Classification Search
CPC .. F28F 2265/00; F28F 27/00; G05D 23/1934; G05B 23/027; G05B 23/0272; G05B 23/0267; G05B 23/0235; F24F 11/526; F24F 11/89; F24F 11/52; F24F 11/32; F24F 11/38; F24F 11/30; F24F 2140/50; F24F 2110/00
USPC ................................................ 165/11.1, 11.2
See application file for complete search history.

(56) References Cited

U.S. PATENT DOCUMENTS 3,024,007 A * 3/1962 Gordon ............. G05D 23/1934
                                                                165/216
3,100,383 A * 8/1963 Foster ................... F25D 29/008
                                                                62/126

(Continued)

*Primary Examiner* — Cassey D Bauer
*Assistant Examiner* — Kirstin U Oswald
(74) *Attorney, Agent, or Firm* — Baker Botts L.L.P.

(57) ABSTRACT

An apparatus includes a high side heat exchanger, a first load, a second load, a first plurality of lights, a second plurality of lights, a third plurality of lights, and a controller. The high side heat exchanger removes heat from a refrigerant. The first load uses the refrigerant to cool a space proximate the first load. The second load uses the refrigerant to cool a space proximate the second load. The first plurality of lights is coupled to the high side heat exchanger. The second plurality of lights is coupled to the first load. The third plurality of lights is coupled to the second load. The controller receives an indication of a detected malfunction in at least one of the high side heat exchanger, the first load, the second load, and in response to the indication, activates the first, second, and third plurality of lights.

21 Claims, 3 Drawing Sheets (51) Int. Cl.
  *F24F 11/526* (2018.01)
  *F24F 11/52* (2018.01)
  *F24F 11/38* (2018.01)
  *F24F 110/00* (2018.01)
  *F24F 140/50* (2018.01)

(56) References Cited

U.S. PATENT DOCUMENTS

| | | | | |
|---|---|---|---|---|
| 3,707,851 A * | 1/1973 | McAshan | F25B 49/00 | 62/125 |
| 4,034,570 A * | 7/1977 | Anderson | F25B 49/02 | 62/158 |
| 4,038,061 A * | 7/1977 | Anderson | F25B 49/02 | 62/126 |
| 4,045,794 A * | 8/1977 | Ohta | G07C 5/0825 | 340/514 |
| 4,045,973 A * | 9/1977 | Anderson | F25B 49/02 | 62/158 |
| 4,068,391 A * | 1/1978 | Smith | G09B 25/02 | 434/383 |
| 4,307,775 A * | 12/1981 | Saunders | F16P 7/02 | 165/11.1 |
| 4,319,712 A * | 3/1982 | Bar | G05D 23/1902 | 165/11.1 |
| 4,372,129 A * | 2/1983 | Bennett | F25B 49/005 | 62/175 |
| 4,391,406 A * | 7/1983 | Fried | G05D 23/1902 | 165/11.1 |
| 4,392,358 A * | 7/1983 | Hicks | F25D 21/008 | 62/128 |
| 4,558,306 A * | 12/1985 | Freliech | F25D 29/003 | 123/41.15 |
| 4,667,481 A * | 5/1987 | Watanabe | A63C 19/00 | 313/500 |
| 4,790,143 A * | 12/1988 | Hanson | F25D 29/003 | 62/126 |
| 4,851,822 A * | 7/1989 | Barnett | F25D 29/003 | 340/635 |
| 4,918,930 A * | 4/1990 | Gaudet | F04B 37/08 | 417/901 |
| 5,055,825 A * | 10/1991 | Yang | B60H 1/00978 | 165/11.1 |
| 5,165,465 A * | 11/1992 | Kenet | G08B 13/19 | 165/11.1 |
| 5,207,071 A * | 5/1993 | Ozu | H02J 3/14 | 62/175 |
| 5,319,572 A * | 6/1994 | Wilhelm | G05B 23/0235 | 702/51 |
| 5,341,649 A * | 8/1994 | Nevitt | F25B 41/006 | 62/126 |
| 5,361,985 A * | 11/1994 | Rein | G08C 17/00 | 236/49.3 |
| 5,435,147 A * | 7/1995 | Mochizuki | G05D 23/1905 | 62/175 |
| 5,634,346 A * | 6/1997 | Ramakrishnan | G05D 23/1904 | 62/89 |
| 6,009,939 A * | 1/2000 | Nakanishi | F24F 11/30 | 165/209 |
| 6,126,080 A * | 10/2000 | Wada | F24F 11/30 | 236/51 |
| 6,225,907 B1 * | 5/2001 | Derryberry | G05D 23/1904 | 340/584 |
| 6,415,619 B1 * | 7/2002 | Bash | F25B 5/02 | 257/E23.098 |
| 8,406,929 B2 * | 3/2013 | Duncan | F24F 5/0035 | 700/277 |
| 2003/0009270 A1 * | 1/2003 | Breed | B60C 11/24 | 701/32.4 |
| 2004/0090317 A1 * | 5/2004 | Rothkop | B60Q 9/008 | 340/435 |
| 2005/0025797 A1 * | 2/2005 | Wang | A61L 31/16 | 424/422 |
| 2005/0079132 A1 * | 4/2005 | Wang | A61L 31/082 | 424/1.11 |
| 2005/0125117 A1 * | 6/2005 | Breed | G07C 5/008 | 701/31.5 |
| 2006/0180371 A1 * | 8/2006 | Breed | G07C 5/008 | 180/197 |
| 2007/0010702 A1 * | 1/2007 | Wang | A61F 2/82 | 600/8 |
| 2007/0157730 A1 * | 7/2007 | Ochiai | F22B 37/003 | 73/627 |
| 2007/0186568 A1 * | 8/2007 | Shah | F25B 49/005 | 62/129 |
| 2008/0147271 A1 * | 6/2008 | Breed | B60R 21/0132 | 701/36 |
| 2009/0217686 A1 * | 9/2009 | Bittner | F25D 17/02 | 62/157 |
| 2009/0314484 A1 * | 12/2009 | Barrett | G05D 23/192 | 165/293 |
| 2010/0302463 A1 * | 12/2010 | Matsumoto | G03B 21/16 | 348/744 |
| 2010/0318221 A1 * | 12/2010 | Wiemer | B67D 1/0021 | 700/240 |
| 2011/0204791 A1 * | 8/2011 | Doughty | H01J 65/044 | 315/113 |
| 2011/0257801 A1 * | 10/2011 | Kumula | H02P 9/04 | 700/287 |
| 2012/0091214 A1 * | 4/2012 | Rixen | F23N 3/08 | 237/5 |
| 2016/0047595 A1 * | 2/2016 | Williams | F25D 29/001 | 62/62 |
| 2016/0146492 A1 * | 5/2016 | Tomomatsu | F24F 11/30 | 700/276 |
| 2017/0074501 A1 * | 3/2017 | Ito | F25B 1/00 | |
| 2017/0325629 A1 * | 11/2017 | Scanlon | F21V 33/0092 | |

* cited by examiner

MALFUNCTION LIGHTING

TECHNICAL FIELD

This disclosure relates generally to cooling and heating systems.

BACKGROUND

Cooling and heating systems are used to cool and heat spaces, such as residential dwellings, commercial buildings, and/or refrigeration units. These systems may be large and include many components that may malfunction separately from each other.

SUMMARY OF THE DISCLOSURE

According to an embodiment, an apparatus includes a high side heat exchanger, a first load, a second load, a first plurality of lights, a second plurality of lights, a third plurality of lights, and a controller. The high side heat exchanger removes heat from a refrigerant. The first load uses the refrigerant to cool a space proximate the first load. The second load uses the refrigerant to cool a space proximate the second load. The first plurality of lights is coupled to the high side heat exchanger. The second plurality of lights is coupled to the first load. The third plurality of lights is coupled to the second load. The controller receives an indication of a detected malfunction in at least one of the high side heat exchanger, the first load, the second load, and in response to the indication, activates the first, second, and third plurality of lights.

According, to another embodiment, a method includes removing heat from a refrigerant using a high side heat exchanger. A first plurality of lights is coupled to the high side heat exchanger. The method also includes cooling a space proximate a first load using the refrigerant. A second plurality of lights is coupled to the first load. The method further includes cooling a space proximate a second load using the refrigerant. A third plurality of lights is coupled to the second load. The method also includes receiving an indication of a detected malfunction in at least one of the high side heat exchanger, the first load, and the second load and in response to the indication, activating the first, second, and third plurality of lights According to yet another embodiment, a system includes a high side heat exchanger, a first load, a second load, a compressor, first plurality of lights, a second plurality of lights, a third plurality of lights, and a controller. The high side heat exchanger removes heat from a refrigerant. The first load uses the refrigerant to cool a space proximate the first load. The second load uses the refrigerant to cool a space proximate the second load. The compressor compresses the refrigerant and to direct the compressed refrigerant to the high side heat exchanger. The first plurality of lights is coupled to the high side heat exchanger. The second plurality of lights is coupled to the first load. The third plurality of lights is coupled to the second load. The controller receives an indication of a detected malfunction in at least one of the high side heat exchanger, the first load, and the second load and in response to the indication, activate the first, second, and third plurality of lights.

Certain embodiments provide one or more technical advantages. For example, an embodiment activates lights on multiple units of an HVAC system when a malfunction is detected. As another example, an embodiment activates lights of different colors based on the severity of a detected malfunction. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
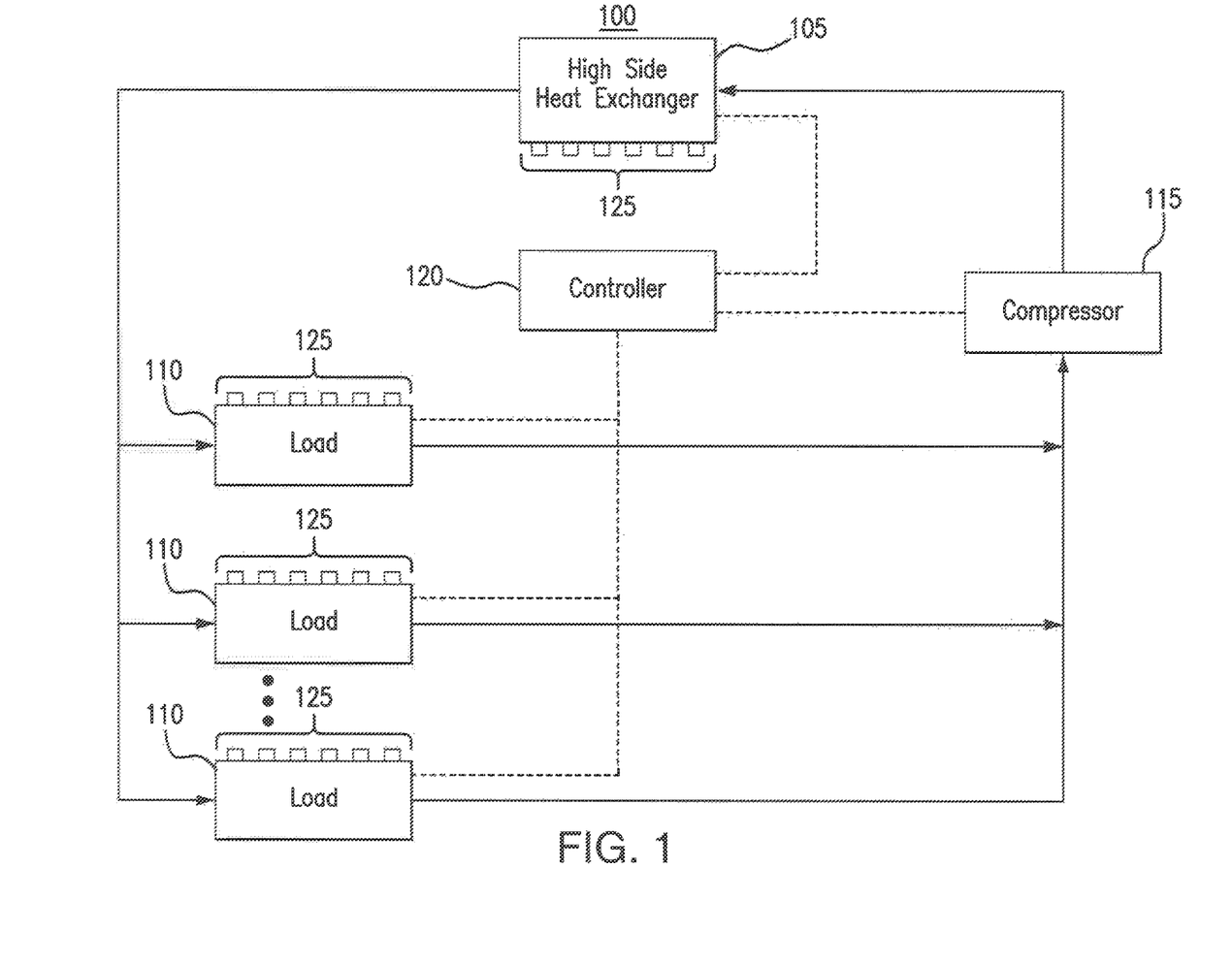
FIG. 1 illustrates portions of an example cooling and/or heating system.
Figure 2:
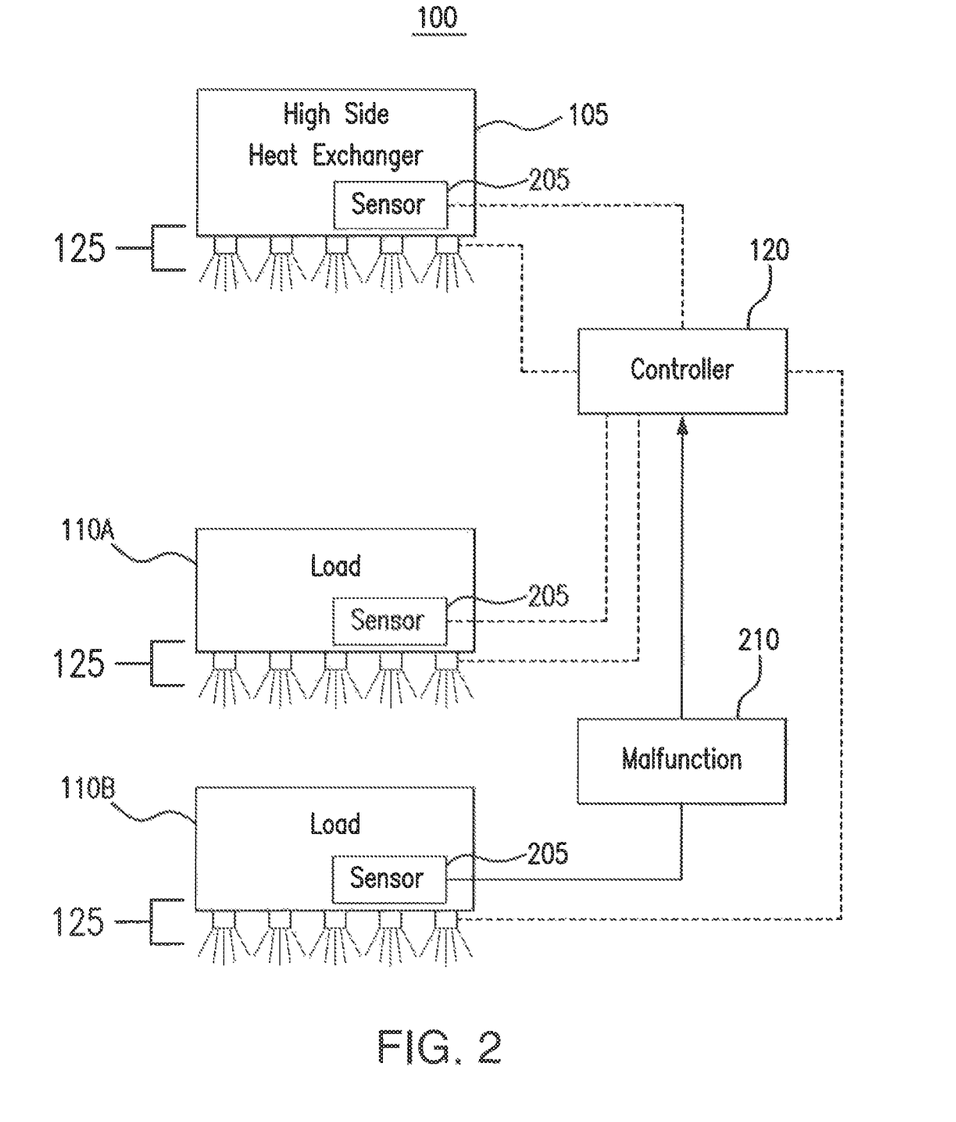
FIG. 2 illustrates certain components of the example system of FIG. 1.
Figure 3:
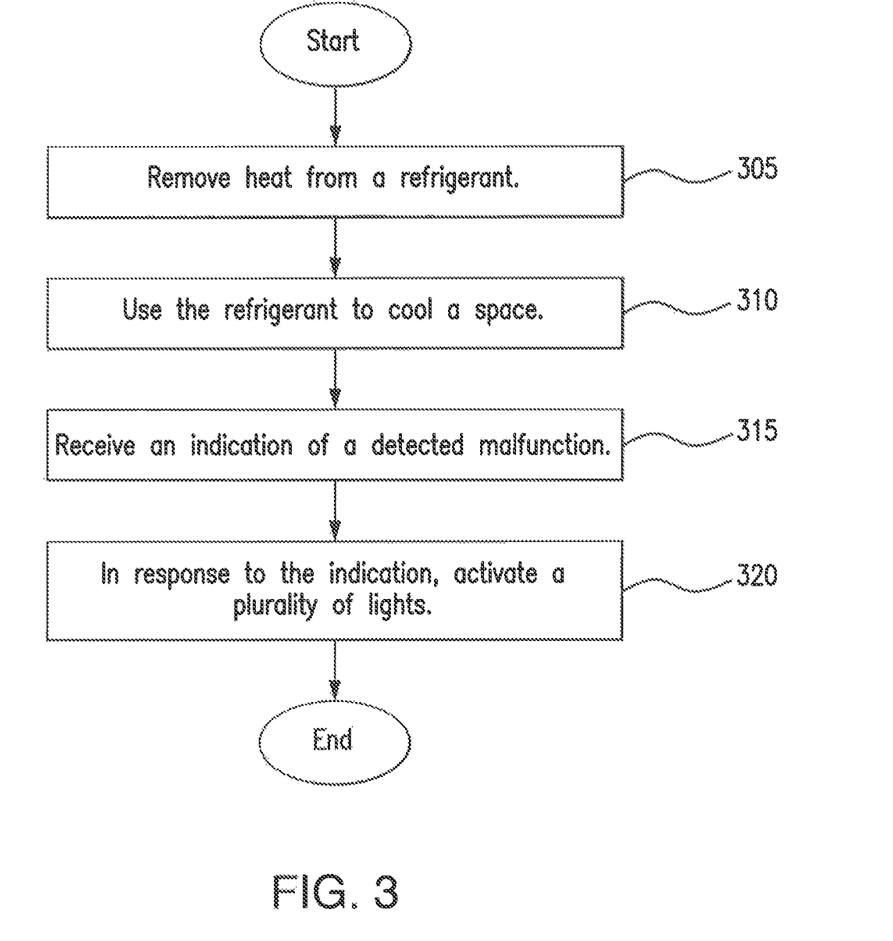
FIG. 3 is a flowchart illustrating a method for handling malfunctions in the system of FIG. 1.

Embodiments of the present disclosure and its advantages are best understood by referring to FIGS. 1 through 3 of the drawings, like numerals being used for like and corresponding parts of the various drawings.

Cooling and heating systems are used to heat and cool spaces, such as residential dwellings, commercial buildings, and/or refrigeration units. These systems may be large and include many components that may malfunction separately from each other. For example, refrigeration systems include several components, such as evaporators and condensers, that are used to cool spaces by circulating cooled air throughout those spaces. These components may malfunction at different times and independent of each other.

In conventional systems, these components may have lights attached to them that indicate when a particular component has malfunctioned. For example, each condenser and/or evaporator may have a light that activates when a problem or malfunction is detected in the particular condenser or evaporator. In other conventional systems, a central controller may include a light that activates when a component malfunctions. However, malfunctions and/or errors may go undetected in certain installations because the components may be installed in such a way that blocks the lights on certain components from being seen. For example, in installations with several evaporators certain evaporators may block the lights on other evaporators. As another example, malfunctioning evaporators may be blocked by merchandise. As a result, if an evaporator malfunctions, that problem may not be detected until a user notices that warm air is being blown from the system. This delay in detecting the malfunction may result in hot spaces and/or spoilage of merchandise. In other conventional systems where a light is located on a central controller, a similar problem arises in detecting a malfunction, Specifically, even though the activated light may be visible to a user, the user may not be able to determine which unit of the system has malfunctioned based on that singular light. As a result, the user may be forced to test each individual component to determine which component malfunctioned. This process may result in delaying the resolution of the malfunction, which could lead to hot spaces and/or spoilage.

This disclosure contemplates an unconventional cooling and/or heating system that includes malfunction lighting on individual components. When a malfunction in any component is detected, all the malfunction lights in the system activate. The component in the system that actually malfunctioned may have its malfunction lighting activate in a different or special manner such as, for example, flashing and/or lighting up in a different color. In this manner, the activated malfunction lights will be visible to a user even if the malfunctioning component is blocked from view in certain embodiments. Additionally, in certain embodiments, the malfunctioning unit may be easily and quickly identified by the user. As a result, the malfunction may be resolved quickly which could prevent spaces that are too hot or too cold. The unconventional system will be described using FIGS. 1 through 3. FIG. 1 will describe the system generally and FIGS. 2 and 3 will describe the system in more detail. Although the previous examples described refrigeration systems, this disclosure contemplates the use of the contemplated malfunction lighting on any cooling or heating system such as air conditioning systems and general heating, ventilation, and air conditioning (HVAC) systems.

FIG. 1 illustrates portions of an example cooling and/or heating system 100. As shown in FIG. 1, system 100 includes a high side heat exchanger 105, one or more loads 110, a compressor 115, and a controller 120. Several components also include lights 125 couple to those components. For clarity, certain components of system 100 have been excluded from FIG. 1 but it is understood that system 100 may include any component necessary to cool and/or heat a space such as, for example, a heater and/or a blower. Additionally for clarity, lights 125 have not been shown on every component of system 100 but it is understood that lights 125 may be coupled to any component of system 100, even unillustrated components. In certain embodiments, malfunctions and errors in system 100 may be quickly identified and resolved by activating all lights 125 when any component of system 100 malfunctions.

High side heat exchanger 105 may remove heat from a refrigerant. When heat is removed from the refrigerant, the refrigerant is cooled. This disclosure contemplates high side heat exchanger 105 being operated as a condenser, a fluid cooler, and/or a gas cooler. When operating as a condenser, high side heat exchanger 105 cools the refrigerant such that the state of the refrigerant changes from a gas to a liquid. When operating as a fluid cooler, high side heat exchanger 105 cools liquid refrigerant and the refrigerant remains a liquid. When operating as a gas cooler, high side heat exchanger 105 cools gaseous refrigerant and the refrigerant remains a gas. In certain configurations, high side heat exchanger 105 is positioned such that heat removed from the refrigerant may be discharged into the air. For example, high side heat exchanger 105 may be positioned on a rooftop so that heat removed from the refrigerant may be discharged into the air. As another example, high side heat exchanger 105 may be positioned external to a building and/or on the side of a building.

Loads HO use refrigerant from high side heat exchanger 105 to cool spaces proximate the loads 110. This disclosure contemplates loads 110 being any cooling component, such as for example, evaporators, coils, plates, fins, and/or heat exchangers. Each load 110 may transfer heat from the space proximate the load 110 into the refrigerant (e.g., the refrigerant may absorb that heat). As a result, the space is cooled. A fan or blower may then circulate the air in the cooled space to other areas to cool those areas. This disclosure contemplates system 100 including any suitable number of loads 110. Each load 110 may be different from another load 110 depending on the needs of various sections of system 100. For example, a load 110 may be a freezer unit and another load 110 may be a refrigeration unit.

Compressor 115 may receive refrigerant from loads 110 and compress the refrigerant. By compressing the refrigerant, compressor 115 concentrates the heat in the refrigerant, thus making it easier for high side heat exchanger 105 to remove that heat front the refrigerant. This disclosure contemplates system 100 including any suitable number of compressors. For example, system 100 may include a compressor 115 for refrigeration units and another compressor 115 for freezer units.

Controller 120 may manage and/or control the operation of the components of system 100. For example, controller 120 may command various components of system 100 to turn on or off. As another example, controller 120 may determine when a component has malfunctioned. In certain embodiments; controller 120 includes a processor and a memory configured to perform any of the functions of controller 120.

A processor is any electronic circuitry, including, but not limited to microprocessors, application specific integrated circuits (ASIC), application specific instruction set processor (ALSIP), and/or state machines, that communicatively couples to a memory and controls the operation of controller 120 and system 100. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware and software that operates to control and process information. The processor executes software stored on memory to perform any of the functions described herein. The processor controls the operation and administration of controller 120 and system 100 by processing information received from other components of system 100. The processor may be a programmable logic device, a microcontroller, a microprocessor, any suitable processing device, or any suitable combination of the preceding. The processor is not limited to a single processing device and may encompass multiple processing devices.

A memory may store, either permanently or temporarily, data, operational software, or other information for the processor. The memory may include any one or a combination of volatile or non-volatile local or remote devices suitable for storing information. For example, the memory may include random access memory (RAM), read only memory (ROM), magnetic storage devices, optical storage devices, or any, other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein.

As discussed previously, FIG. 1 illustrates only certain components of system 100. It is understood that system 100 may include other components such as a heater, blower and/or valves.

Lights 125 are coupled to various components of system 100. In the example of FIG. 1, lights 125 are coupled to high side heat exchanger 105 and loads 110. Although not illustrated, lights 125 may also be coupled to controller 120, compressor 115, and to the other unillustrated components of system 100 such as, for example, a heater and/or a blower.

When a component of system 100 malfunctions, the lights 125 of system 100 may be activated even though the component to which certain lights 125 are coupled has not malfunctioned. For example, if one of the loads 110 malfunctions, then the lights 125 on that load and the other loads 110 and the lights 125 on high side heat exchanger 105 may be activated. In this manner, lights 125 may indicate a malfunction to a user even if the lights 125 of a malfunctioning unit are obstructed from view by other components of system 100. The user may then quickly identify and resolve the malfunction which could prevent spaces that are too hot or too cold and/or spoilage. The operation of system 100 will be described in more detail using FIGS. 2 and 3.

FIG. 2 illustrates certain components of the example system 100 of FIG. 1. For clarity, certain components of system 100 have not been illustrated in FIG. 2 but it is understood that system 100 includes any component of a cooling and/or heating system such as a compressor, a heater, a blower and/or valves.

As seen in FIG. 2, high side heat exchanger 105, first load 110A, and second load 110E each include a sensor 205. Although not illustrated, it is understood that each component of system 100 may include any suitable number of sensors 205. Each sensor 205 may be configured to detect any malfunction in a particular component of system 100. For example, sensor 205 may be a temperature sensor that detects when the temperature of a refrigerant in a particular component is too hot or too cold. As another example, sensor 205 may be a pressure sensor that senses when the pressure of a refrigerant in a component is too high or too low. As yet another example, sensor 205 may be configured to detect when a heater is not heating air as well as it should. Additionally, a sensor 205 may be configured to detect an electrical problem in any component of system 100. This disclosure contemplates a sensor 205 being configured to detect any characteristic or issue with any component of system 100.

In the example of FIG. 2, sensor 205 in second load 110E has detected a malfunction 210. Sensor 205 and/or second load 110B reports malfunction 210 to controller 120. Controller 120 may receive the indication of malfunction 210 and in response, controller 120 communicates signals to activate lights 125. As a result, lights 125 on high side heat exchanger 105, first load 110A, and second load 110B activate. Although not illustrated, controller 120 may also activate lights 125 on other components of system 100 such as, for example, a compressor, a heater and/or a blower. Because lights 125 on high side heat exchanger 105 and first load 110A are activated, a user may be able to determine that malfunction 210 has occurred even if lights 125 on second load 110B are obstructed from view by objects, such as other components of system 100 or merchandise. Controller 120 may activate lights 125 on the malfunctioning component differently from the lights 125 on other components of system 100. For example, if sensor 205 in second load 110E has detected the malfunction, then controller 120 may activate lights 125 on all components of system 100, but flash the lights 125 on second load 110B. In this manner, a user can visually detect that a malfunction has occurred and search for the component with flashing lights 125 to identify the malfunctioning component.

In certain embodiments, controller 120 may further determine a severity for malfunction 210. The severity may indicate the impact that malfunction 210 has on system 100. For example, if malfunction 210 is that second load 110B experienced a brief electrical short that has been resolved, controller 120 may determine that malfunction 210 has a low severity. As another example, if malfunction 210 is that second load 110E is not receiving refrigerant that is cold enough to cool a space, controller 110 may determine that malfunction 210 has a medium severity. As yet another example, if malfunction 210 indicates that the pressure of the refrigerant in second load 110E is reaching critical levels and second load 110E may be damaged and/or explode, then controller 120 may determine that malfunction 210 has a high severity.

Controller 120 may activate lights 125 based on the determined severity of malfunction 210. For example, controller 120 may determine a flash rate for lights 125 based on malfunction 210. The higher the severity, the faster lights 125 may flash or blink. In this manner, a user may be able to determine the severity of a malfunction 210 based on how quickly lights 125 are blinking and/or flashing. As another example, controller 120 may activate lights 125 with particular colors depending on the severity of malfunction 210. For example, controller 120 may activate lights 125 to shine yellow when the severity of malfunction 210 is medium. As another example, controller 120 may activate lights 125 to shine red when the severity of malfunction 210 is high. In this manner, a user may determine the severity of malfunction 210 by observing the colors of lights 125.

In some embodiments, controller 120 may determining a flash rate for lights 125 based on the duration of malfunction 210. For example, controller 120 may flash lights 125 at a certain rate when malfunction 210 is first detected. Then, if malfunction 210 goes unresolved or unnoticed for a period of time, controller 120 may increase that flash rate. The longer malfunction 210 is unresolved or unnoticed, the higher the flash rate may become. Controller 120 may also decrease the flash rate the longer malfunction 210 goes unresolved or unnoticed. In this manner, a user may observe the flash rate to determine or approximate how long malfunction 210 has been occurring.

In certain embodiments, controller 120 may identify the component of system 100 that has malfunctioned by activating the lights 125 on that component differently than the lights 125 on other components. For example, controller 120 may flash the lights 125 on the malfunctioning component at a different rate than the lights 125 on the other components. As yet another example, controller 120 may activate the lights 125 on the malfunctioning component to shine with a different color than the lights 125 on the other components of system 100. In this manner, a user may determine which component of system 100 is malfunctioning by observing which component has different lighting.

In certain instances, controller 120 may activate lights 125 to perform identification functions. For example, when system 100 includes many components such as loads 110, a user may communicate an instruction to controller 120 to identify a third load. Controller 120 may then activate the lights 125 on the third load to identify the third load. In this manner, the user can quickly identify the various components of system 100 by observing the lights 125 that are activated.

In some instances, controller 120 may use lights 125 to indicate to a user when a component has been properly installed. When system 100 has many components to be installed, the installation procedure may take a lot of time and effort. After a component of system 100 is installed, the user may send an instruction to controller 120 to indicate whether the component is configured to start (e.g., a configuration check). For example, a component may be ready to start if it has been installed properly. Sensors 205 may be configured to detect whether a component is configured to be started and/or installed properly. Sensor 205 may communicate to controller 120 whether a component is configured properly and/or ready to be started. In response, controller 120 may activate the lights 125 on that component if it is installed properly and/or ready to be started. In this manner, a user may observe the lights 125 of a component to determine whether that component has been installed properly. Components whose lights 125 do not activate may not have been installed properly and the user may investigate to see whether the component should be reinstalled. In some embodiments, the lights 125 on a component may activate automatically when the component has been installed properly. As each component is installed, a user may receive a visual indication from lights 125 that that component was installed correctly. The user may continue to install and/or configure a particular component until the lights 125 on that component activate indicating that the component has been installed and/or configured properly. When all components are installed and/or configured properly, the lights 125 on all components will activate.

In particular embodiments, system 100 further includes a speaker that communicates audible signals. Controller 120 may communicate a signal to the speaker to produce an audible signal when controller 120 receives an indication of malfunction 210. In this manner, a user may be alerted with an audible signal that a malfunction 210 has been detected in system 100. This disclosure contemplates any suitable audible signal, such as for example one or more of a siren, a beep, a horn, or a voice.

FIG. 3 is a flowchart illustrating a method 300 for handling malfunctions in the system 100 of FIG. 1. In particular embodiments, various components of system 100 perform method 300. By performing method 300, malfunctions in system 100 may be quickly identified and/or resolved.

A high side heat exchanger may begin by removing heat from a refrigerant, in step 305. The high side heat exchanger may be a condenser for example. In step 310, a load uses the refrigerant to cool a space. The load may be an evaporator for example. The evaporator may be part of a refrigeration or freezer unit. The refrigerant in the evaporator may absorb heat from the space proximate the evaporator. Then the air in the cooled space may be circulated by a fan to other areas to cool those areas.

A controller receives an indication of a detected malfunction in step 315. The malfunction may have been detected by a sensor in the condenser or the evaporator. The sensor may detect errors or issues in refrigerant temperature, refrigerant pressure, etc. When the sensor detects a malfunction, that malfunction may be reported to the controller, in response to the indication, the controller activates a plurality of lights in step 320. For example, the controller may activate the lights on the high side heat exchanger and the load. The controller may also activate lights on other components like a compressor. Significantly, the controller activates lights on components that have not malfunctioned so that it is easier for a user to detect that a malfunction has been reported. In this manner, a user may observe the lights and quickly determine that a malfunction has occurred even if the lights on a malfunctioning unit are obstructed from view.

Modifications, additions, or omissions may be made to method 300 depicted in FIG. 3. Method 300 may include more, fewer, or other steps. For example, steps may be performed in parallel or in any suitable order. While discussed as system 100 (or components thereof) performing the steps, any suitable component of system 100 may perform one or more steps of the method.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
    a high-pressure side heat exchanger configured to remove heat from a refrigerant;
    a first cooling component configured to use the refrigerant to cool a first space;
    a second cooling component configured to use the refrigerant to cool a second space;
    a first plurality of lights coupled directly to the high-pressure side heat exchanger;
    a second plurality of lights coupled directly to the first cooling component;
    a third plurality of lights coupled directly to the second cooling component; and
    a controller configured to:
        receive an indication that one of the high-pressure side heat exchanger, the first cooling component, and the second cooling component has malfunctioned; and
        in response to the indication, activate the first, second, and third plurality of lights.

2. The apparatus of claim 1, wherein the controller is further configured to:
    flash the first plurality of lights if the received indication indicates that the high-pressure side heat exchanger has malfunctioned;
    flash the second plurality of lights if the received indication indicates that the first cooling component has malfunctioned; and
    flash the third plurality of lights if the received indication indicates that the second cooling component has malfunctioned.

3. The apparatus of claim 1, wherein the controller is further configured to:
    determine a severity; and
    determine a color based on the determined severity, wherein activating the first, second, and third plurality of lights comprises activating the first, second, and third plurality of lights to produce the determined color.

4. The apparatus of claim 1, wherein the controller is further configured to:
    receive an instruction to identify the first cooling component; and
    in response to the instruction, activate the second plurality of lights.

5. The apparatus of claim 1, wherein the controller is configured to:
receive an instruction to perform a configuration check;
in response to the instruction:
determine that the first cooling component is configured to be started; and
activate the second plurality of lights in response to the determination that the first cooling component is configured to be started.

6. The apparatus of claim 1, further comprising a speaker, wherein the controller is further configured to produce an audible signal over the speaker in response to the indication.

7. The apparatus of claim 1, further comprising:
a first sensor coupled to the high-pressure side heat exchanger, the first sensor configured to detect that the high-pressure side heat exchanger has malfunctioned;
a second sensor coupled to the first cooling component, the second sensor configured to detect that the first cooling component has malfunctioned; and
a third sensor coupled to the second cooling component, the third sensor configured to detect that the second cooling component has malfunctioned.

8. A method comprising:
removing heat from a refrigerant using a high-pressure side heat exchanger, a first plurality of lights is coupled directly to the high-pressure side heat exchanger;
cooling a space proximate a first cooling component using the refrigerant, a second plurality of lights is coupled directly to the first cooling component;
cooling a space proximate a second cooling component using the refrigerant, a third plurality of lights is coupled directly to the second component;
receiving an indication that one of the high-pressure side heat exchanger, the first cooling component, and the second component has malfunctioned; and
in response to the indication, activating the first, second, and third plurality of lights.

9. The method of claim 8, further comprising:
flashing the first plurality of lights if the received indication indicates that the high-pressure side heat exchanger has malfunctioned;
flashing the second plurality of lights if the received indication indicates that the first cooling component has malfunctioned; and
flashing the third plurality of lights if the received indication indicates that the second cooling component has malfunctioned.

10. The method of claim 8, further comprising:
determining a severity; and
determining a color based on the determined severity, wherein activating the first, second, and third plurality of lights comprises activating the first, second, and third plurality of lights to produce the determined color.

11. The method of claim 8, further comprising:
receiving an instruction to identify the first cooling component; and
in response to the instruction, activating the second plurality of lights.

12. The method of claim 8, further comprising:
receiving an instruction to perform a configuration check;
in response to the instruction:
determining that the first cooling component is configured to be started; and
activating the second plurality of lights in response to the determination that the first cooling component is configured to be started.

13. The method of claim 8, producing an audible signal over a speaker in response to the indication.

14. The method of claim 8, further comprising:
detecting that the high-pressure side heat exchanger has malfunctioned using a first sensor coupled to the high-pressure side heat exchanger;
detecting that the first cooling component has malfunctioned using a second sensor coupled to the first cooling component; and
detecting that the second cooling component has malfunctioned using a third sensor coupled to the second cooling component.

15. A system comprising:
a high-pressure side heat exchanger configured to remove heat from a refrigerant;
a first cooling component configured to use the refrigerant to cool a space proximate the first cooling component;
a second cooling component configured to use the refrigerant to cool a space proximate the second cooling component;
a compressor configured to compress the refrigerant and to direct the compressed refrigerant to the high-pressure side heat exchanger;
a first plurality of lights coupled directly to the high-pressure side heat exchanger;
a second plurality of lights coupled directly to the first cooling component;
a third plurality of lights coupled directly to the second cooling component; and
a controller configured to:
receive an indication that one of the high-pressure side heat exchanger, the first cooling component, and the second cooling component has malfunctioned; and
in response to the indication, activate the first, second, and third plurality of lights.

16. The system of claim 15, wherein the controller is further configured to:
flash the first plurality of lights if the received indication indicates that the high-pressure side heat exchanger has malfunctioned;
flash the second plurality of lights if the received indication indicates that the first cooling component has malfunctioned; and
flash the third plurality of lights if the received indication indicates that the second cooling component has malfunctioned.

17. The system of claim 15, wherein the controller is further configured to:
determine a severity; and
determine a color based on the determined severity, wherein activating the first, second, and third plurality of lights comprises activating the first, second, and third plurality of lights to produce the determined color.

18. The system of claim 15, wherein the controller is further configured to:
receive an instruction to identify the first cooling component; and
in response to the instruction, activate the second plurality of lights.

19. The system of claim 15, wherein the controller is configured to:
receive an instruction to perform a configuration check;
in response to the instruction:
determine that the first cooling component is configured to be started; and activate the second plurality of lights in response to the determination that the first cooling component is configured to be started.

20. The system of claim 15, further comprising a speaker, wherein the controller is further configured to produce an audible signal over the speaker in response to the indication.

21. The system of claim 15, further comprising:
a first sensor coupled to the high-pressure side heat exchanger, the first sensor configured to detect that the high-pressure side heat exchanger has malfunctioned;
a second sensor coupled to the first cooling component, the second sensor configured to detect that the first cooling component has malfunctioned; and
a third sensor coupled to the second cooling component, the third sensor configured to detect that the second cooling component has malfunctioned.

* * * * *